W. J. DUNNACHIE.
PROCESS OF MAKING AND RECOVERING AMMONIA, &c.
APPLICATION FILED APR. 3, 1908.
943,399.
Patented Dec. 14, 1909.
2 SHEETS—SHEET 1.
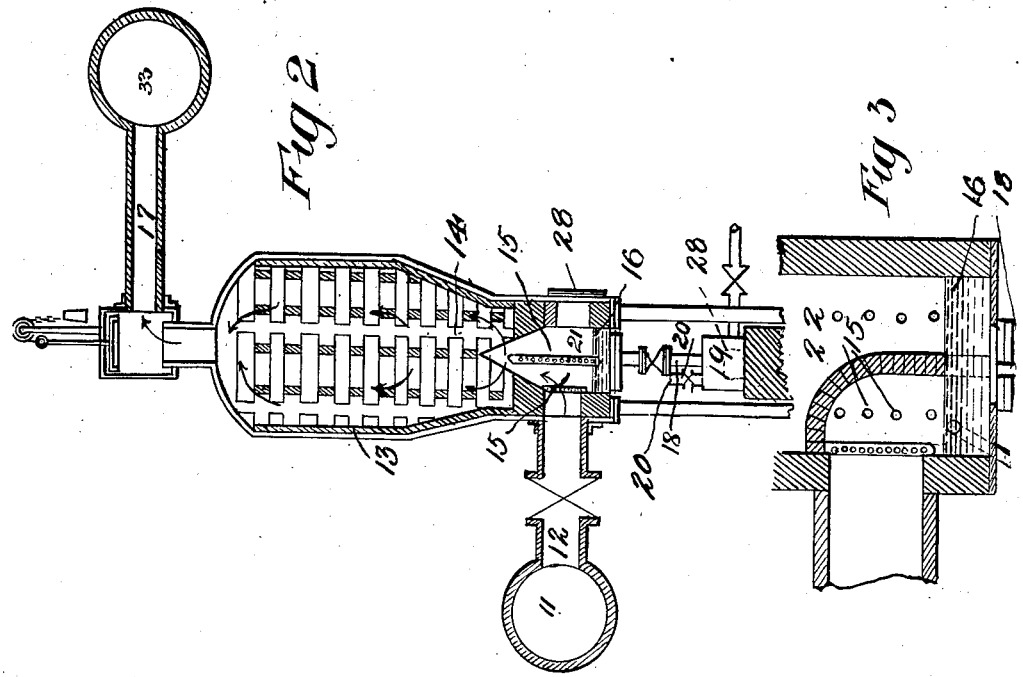
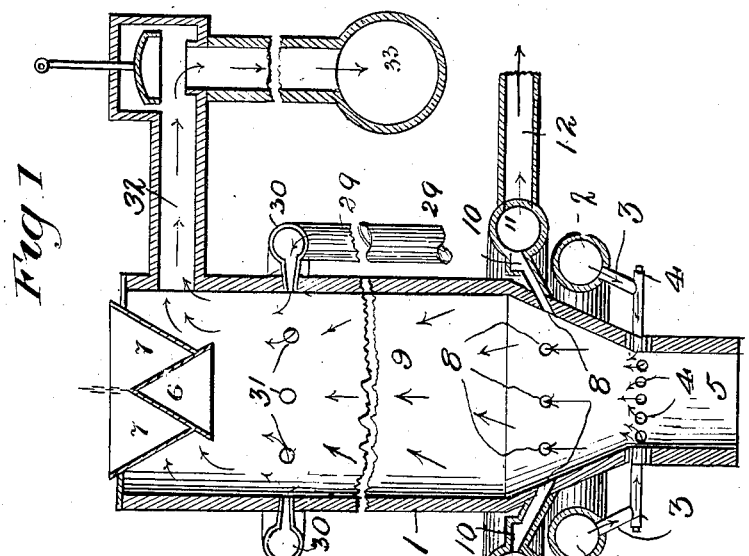

W. J. DUNNACHIE.
PROCESS OF MAKING AND RECOVERING AMMONIA, &c.
APPLICATION FILED APR. 3, 1908.
943,399.
Patented Dec. 14, 1909.
2 SHEETS—SHEET 2.
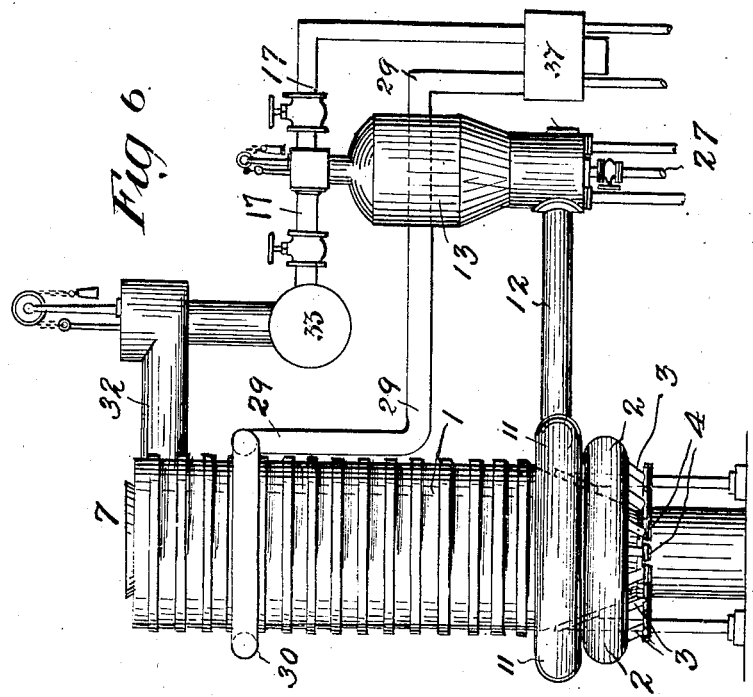
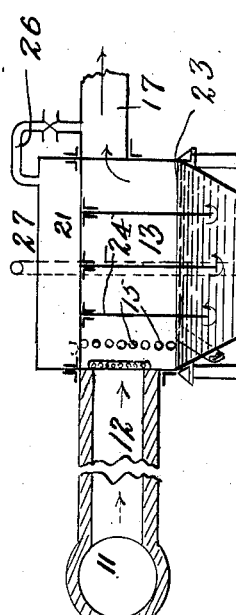
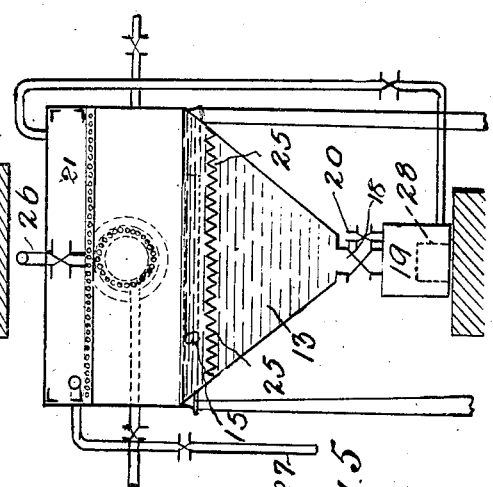

UNITED STATES PATENT OFFICE.

WILLIAM JAMES DUNNACHIE, OF COATBRIDGE, SCOTLAND.

PROCESS OF MAKING AND RECOVERING AMMONIA, &c.

943,399.

Specification of Letters Patent.  Patented Dec. 14, 1909.

Application filed April 3, 1908. Serial No. 425,079.

*To all whom it may concern:*

Be it known that I, WILLIAM JAMES DUNNACHIE, of Viewfield, Coatbridge, in the county of Lanark, Scotland, have invented a certain new and useful Process of Making and Recovering Ammonia and other By-Products, of which the following is a specification.

This invention relates to blast or other furnaces, gas-producers, retorts, coke-ovens and the like, in which coke, coal, or other fuel, carbonaceous or nitrogenous substance, is distilled or is destructively consumed, and the resulting gas from which is being, or may be, treated for the recovery of ammonia and its compounds such as tar and other by-products.

Hitherto the gas from blast furnaces, gas-producers, coke-ovens, oil shale retorts and the like, in which raw coal, shale, or other carbo-nitrogenous substance constituted the charge, has been so treated, but not so that from coke or anthracite fed furnaces, gas-producers, and the like, because the amount of recoverable residuals in the gas is so small, under present conditions, that their profitable extraction is impossible.

The object of my invention is to convert what may be termed the fixed nitrogen of the coal, coke, shale, or other carbo-nitrogenous matter, cyanogen and its compounds, and in cases where air is introduced, possibly some of the nitrogen of the blast or air, into ammonia and thereby largely to increase the present yield of ammonia from such sources; and to bring anthracite and coke-fed furnaces and the like into the category of profitable producers of ammonia. To accomplish this object, I withdraw a portion of the hotter gas, in the case of the blast-furnace and other force-blast furnaces from above the twyers, and, in the case of coke-ovens, retorts and the like, where air is not introduced, from the hotter regions, I cause this gas immediately after its withdrawal and before its temperature has been greatly reduced, to mix intimately with steam, water-spray and in certain contingencies, a small volume of air and thereafter to pass through water, in an external vessel, as will be hereinafter described.

In order that my invention may be properly understood and readily carried into effect, I have hereunto appended two sheets of drawings, of which—

Figure 1 illustrates in vertical section a blast furnace to which the improvements embodying my invention are applied. Fig. 2 is a vertical section of a mixing vessel or apparatus designed to be used in connection with the blast furnace illustrated in Fig. 1. Fig. 3 is a section of a modified form of the lower part of the mixing vessel or apparatus, shown in Fig. 2, drawn to enlarged scale and constructed with a brick bridge or arch. Fig. 4 is an end elevation of a modification of the mixing vessel or apparatus illustrated in Fig. 2. Fig. 5 is a side elevation of the modification shown in Fig. 4. Fig. 6 is an elevation of the plant embodying the apparatus, illustrated in Figs. 1 and 2, all hereinafter more fully referred to and described.

Referring first to Figs. 1 and 2 of the drawings, which show one embodiment of a portion of the device for carrying out my improved process, the blast furnace 1 is provided below with the usual horseshoe air-blast main 2 connecting by downwardly projecting ducts 3 with the twyers 4 communicating with the interior of the furnace immediately above the crucible 5. In the upper end of the furnace, the bell 6 is adapted to admit the charge in the usual manner from the hopper 7. In the hotter regions above the twyers 4, one or more openings 8 (see Fig. 1) are provided into the interior of the furnace 9. Into these openings I insert brick-lined tubes 10, connecting at their outer extremities with a brick-lined horse-shoe main 11, for the reception of the escaping gas from the hotter regions of the blast-furnace. From the horse-shoe main 11, a brick-lined iron tube 12 connects with what I have termed the mixer, 13, (Figs. 2 and 4). The mixer 13 (Fig. 2) is a brick-lined chamber filled with brick-checker-work 14, or other suitable intersticed material, the object of which is to insure the intimate mixture of the hot gas with steam or water-spray, or mixture of steam and water and, when required, a small volume of air, for the purpose of converting the cyanids into ammonia. The steam or water-spray or the mixture of both, enter by the pipes 15 which are perforated by a series of holes so as more effectually to secure this intimate mixture. They are arranged to bring the steam or water-spray into contact with the hot gas immediately on its entrance into the mixer and before it has greatly cooled. When required, a small volume of compressed air is blown in by the horizontal pipe 16 perforated on its upper side. The rush of air produces a further spray of water while the escaping air in the presence of sulfureted hydrogen, contained in the gas, promotes the complete conversion of the cyanids into ammonia and prevents the formation of carbonic acid as a constituent of the escaping gas. The distribution of the steam and water-spray may be attained in many other ways. According to one mode of operation, the gas and ammonia are conveyed from the mixer by a suitable pipe 17 to the green-gas tube 33, for conveyance to the recovery works, when there are such; or according to another method of procedure, the gas and ammonia are conducted from the mixer 13 through the pipe 29 into the horse-shoe main 30 from whence it is admitted into the upper cooler portions of the furnace to be treated preliminary to its conveyance to the ammonia-recovery works. The alkalies contained in the gas are retained in solution in the mixer 13, where they are gradually concentrated and periodically drawn off by the pipe 18, into the receiver 19, and thence by compressed air, operating through the pipe 20, the partially concentrated alkaline solution may be discharged into the concentrator 21, for further concentration by the heat emanating from the mixer 13. The ammonia, distilled off during this further concentration, passes into the tube 17.

In Fig. 3 the gas entering the mixer 13 is intercepted by a brick bridge or arch 22, which dips into the water contained in the lower body of the mixer. The gas is brought into contact with steam, air, and water-spray which enter the mixer by the pipes 15, and is then forced or drawn under the arch 22.

By another modification, see Figs. 4 and 5, I cause the hot gas to pass into the mixer 13, which is an iron vessel, (brick-lined where necessary) partially filled with water to the level 23, and subdivided as to its length by a series of serrated baffle iron or steel plates 24 which dip into the water several inches. The hot gas on entering the mixer is intimately mixed with steam, air and water-spray and is forced or drawn under the baffle plates whereby it is divided into fine streams by the serrated edges 25, and thereby brought into intimate contact with the water which, by the heat communicated from the gas, is soon raised to boiling point. The net result of the violent ebullition of, and rush of gas and air through the water, will be the automatic creation of an atmosphere of steam, water-spray and gas, which is the condition most favorable to the complete conversion of the cyanids into ammonia. The amount of injected steam is, by this means, reduced to a minimum. The evaporation of the water is made good by the admission of water to a sufficient amount. The gas and ammonia pass off by the tube 17, into the green-gas main for treatment at the ammonia recovery works; but where such do not exist, they may be led into one or more saturators 37, see Fig. 6, containing sulfuric acid where the ammonia will be immediately converted into sulfate of ammonia and the escaping gas conveyed by suitable pipes to condensers for distribution as required; and the water from the condensers returned, if desired, to supply the mixer 13. The potash and soda contained in the hot gas as cyanids of potash and soda will be retained in the water, contained in the mixer as impure caustic soda and potash, where they will be gradually concentrated and may be treated as already described.

According to Figs. 4 and 5, the ammonia from the concentrator 21 is conveyed to the tube 17 by the pipe 26 and the still liquid concentrate is run off by the pipe 27. This concentrate may be subsequently filtered and evaporated to dryness for disposal or reintroduction with or without additions to the furnace charges. Again, said concentrate may be conveyed directly to the receiver 19 from which it is piped to the recovery works for the extraction of the ammonia, potash and soda contained in it. Any deposit collecting in the interior of the receivers 19 (Figs. 2, 4 and 5) may be removed through the clearing door 28.

Whenever the volume of gas to be treated is large and at a high temperature, it is desirable to pass it successively through both mixers shown in Figs. 2 and 3. The loss of heat sustained by the furnace, may be made good by introducing an excess of combustible in the charge or by introducing superheated gas above the level at which the gas is drawn off.

By means of a third modification, the gas and steam after treatment with sulfuric acid, may be conveyed by a suitable tube 29 (Fig. 6) to a second horse-shoe main 30 (Figs. 1 and 6) communicating by one or more twyers 31 with the upper regions of the interior of the furnace 9. From the main 30, the gas and steam are introduced to the furnace, where they react upon the fixed nitrogen of the fuel for its conversion into ammonia by means of the steam conveyed with the gas. The steam on entering this cooler region or zone of the furnace, is in part, decomposed by the red hot carbon whereby hydrogen is liberated which, in its nascent state, will immediately combine with some of the fixed nitrogen of the raw material or with cyanogen gas, (if present) to form ammonia. This ammonia will be protected from decomposition, in its passage through the hot raw material to the main gas tube 33, by the excess of steam, free hydrogen and hydrocarbon gases contained in the mixed gas. The yield of ammonia will thus be greatly increased, irrespective of whether the raw material used be coal, coke, anthracite, or other carbo-nitrogenous material.

I will now explain my invention as applied to the extraction of valuable products from waste heaps of carbo-nitrogenous matter, such as are found at most collieries, and shale mines; also the application of my process to the economic manufacture of gas for metallurgical and other purposes from such waste heaps, round and small coal, lignite, peat, or other form of such carbonitrogenous material. As applied to such purpose, I erect one or more blast-furnaces provided with hot or cold blast. If desired, the fuel charged into the furnace or furnaces through the bell and hopper may be mixed with the necessary proportions of lime or other flux to form a liquid slag with the ash. The hot gas is extracted and treated in the manner already described. Steam from the horse-shoe main 30 (see Fig. 1) is injected through the twyers 31, and the gas escaping from the tub 32, combined with that from the mixer 13, is conveyed by the tube 33, to a suitable tar and ammonia recovery plant, whence the purified gas is distributed to the metallurgical works, for heating-stoves, boilers, gas-engines and the like. By a careful mixture of the materials charged into these gas producers, a slag can be produced of a composition admirably suited for the manufacture of cement.

It is obvious from the nature of my improved process that it is one that accommodates itself to many modifications of the plant I have shown for carrying it out.

I claim:—

1. The process of recovering ammonia and other by-products which consists in taking off, at the hotter regions, the hot gases from blast furnaces, gas producers and similar appliances consuming a mixture of carbo-nitrogenous fuel, in treating these hot gases immediately after removal from the furnace with an aqueous fluid and thereafter with sulfuric acid; in introducing them again to the cooler part of the furnace at a point above the level from which they were drawn; in collecting the converted gas from the top of the furnace; and finally in absorbing the ammonia therefrom.

2. The method of recovering ammonia and other by-products from carbo-nitrogenous substances which consists in taking off, at the hotter regions, a portion of the furnace gases from blast-furnaces, gas-producers and similar appliances consuming carbo-nitrogenous fuel, in treating said gases with an aqueous fluid immediately after removal from the furnace, and thereafter with sulfuric acid; and finally reintroducing the gases into the cooler and upper region of the furnace.

3. The process for the recovery of ammonia which consists in drawing off, at the hotter regions, a portion of the gases from blast-furnaces, gas producers and similar appliances consuming a mixture of carbo-nitrogenous fuel, in treating said portion with an aqueous fluid immediately after removal from the furnace, to convert the cyanids into ammonia and thereafter with sulfuric acid to absorb said ammonia; in reintroducing the gases so treated into the upper and cooler region of the furnace and finally in collecting the gases from the top of the furnace.

4. The process for the manufacture of ammonia which consists in taking cyanogen-containing gas from the hotter regions of blast-furnaces, gas-producers and similar appliances consuming carbo-nitrogenous fuel, in treating the same with an aqueous fluid in the presence of an intermittent blast of air to convert the cyanid into ammonia; and in absorbing the ammonia.

5. The process of recovering ammonia from the gases of blast-furnaces, gas-producers and similar appliances, consuming carbo-nitrogenous fuel, which process consists in drawing off, at the hotter regions, portions of the hot gases; in submitting such gases immediately after removal from the furnace to the action of an aqueous fluid in the presence of an intermittent blast of air; in recovering the fixed alkalies formed by such action; and finally in absorbing the ammonia.

In witness whereof I have hereunto set my hand in the presence of two witnesses.

WILLIAM JAMES DUNNACHIE.

Witnesses:
JOHN LIDDLE,
JOHN T. LIDDLE.